United States Patent Office 3,488,144
Patented Jan. 6, 1970

3,488,144
RECOVERY OF COPPER CONTAMINATED
PLATINUM GROUP CATALYST METAL
SALTS
Herbert Sargent, Garden Grove, Calif., assignor to Atlantic Richfield Company, Philadelphia, Pa., a corporation of Pennsylvania
No Drawing. Filed Jan. 6, 1967, Ser. No. 607,634
Int. Cl. C01d 3/04; C01g 55/00
U.S. Cl. 23—87                                   11 Claims

ABSTRACT OF THE DISCLOSURE

Platinum group metal catalysts are recovered as double salts, for example as $K_2PdCl_4$. The contaminated catalyst metal is dissolved in water or acetic acid containing a peroxidic oxidant, chloride ion and an alkali metal ion, at 25–100° C. The mixture is cooled to precipitate the double salt which is separated by filtration, etc. The recovered catalyst metal salt is free of copper contamination.

---

This invention comprises a process for reactivating and purifying spent platinum group metal catalysts, particularly palladium catalysts which have been used in the presence of copper contaminants such as catalysts for vinyl acetate production.

In the production of vinyl esters such as vinyl acetate from ethylene in a liquid phase, platinum group metal salts and acetate salt catalyst systems are normally used. Typically, the catalyst is regenerated in a vinyl acetate reactor by means of a redox system comprising cuprous-cupric acetate. The catalyst metal ions are reduced to the metallic form during synthesis of vinyl acetate and the redox system oxidizes the metal back to ions. The presence of copper in the reactor bath causes severe contamination of the catalyst after it has become deactivated. Platinum and palladium are also used as catalysts in other processes such as oxychlorination and hydrogenation in which they are contaminated with impurities which must eventually be removed.

Regeneration of these catalyst metals has generally been accomplished by dissolving the metal with contaminants in aqua regia and then evaporating to dryness in several steps to recover a pure metal product. This process however is time-consuming and expensive. Furthermore, it is undesirable because of the fumes produced by evaporation of aqua regia which are harmful to personnel and corrosive to equipment. Also, other metal contaminants such as Group 1–B metals may be retained even after the successive dissolving and evaporation steps in aqua regia.

It is an object of this invention to provide a method for purifying contaminated platinum group metal catalysts which is relatively quick and safe.

Another object of this invention is to provide a process for recovering contaminated platinum metal catalysts which does not require a series of successive dissolving and evaporating steps.

A still further object of the invention is to provide a process for recovering a platinum metal from contaminated platinum metal catalysts, said recovered metal being substantially free of any metal contaminants.

Yet another object of this invention is to provide a process for recovering palladium metal in a substantially uncontaminated state from palladium catalysts which have become contaminated with metal salts.

Another object of this invention is to provide a process for recovering a substantially pure double salt of palladium or platinum from a contaminated palladium or platinum catalyst.

These and other objects of this invention will become more readily apparent from the appended claims and following detailed discussion.

Briefly, this invention comprises a solution composition and process for purifying a contaminated, spent platinum group metal catalyst. The catalyst is dissolved with the contaminants in a hot aqueous solution containing an oxidant, an anion, and an alkali metal cation. The solution, while hot, is filtered to remove all undissolved solids such as catalyst supports and the like. The filtered solution is then cooled to precipitate crystals of catalyst metal double salt and filtered through a solid filter cake to remove the double salt crystals which are substantially free of copper or other metal contaminants. The double salts are recovered in a highly purified form by washing the crystals with an acetone-water wash to remove any solution from the crystal surfaces. The platinum metal double salt is relatively insoluble in the acetone-water wash and is recovered as copper-free crystals.

The platinum group metals which may be treated by the process of this invention include ruthenium, rhodium, palladium, osmium, iridium and platinum. The recovered double salts can be used as catalysts or broken down for recovery of the metal.

To function in the process of this invention, the solution in which the contaminated platinum metal catalyst is dissolved should contain three basic ingredients: an oxidant, an anion providing acid and a cation supplying salt. The oxidant must supply peroxidic oxygen to oxidize the catalyst metal to its ionic form so that it can be dissolved and later precipitated as a double salt. It has been determined that persulfates, organic peroxides and hydroperoxides can be used. Hydrogen peroxide is preferred since it is easily obtainable and relatively inexpensive.

The second ingredient of the solution is an acid which will supply anions for the double salt. Hydrochloric acid, hydrobromic acid, fluoroboric acid, perchloric acid, chloric acid and organic acids such as acetic acid, chloroacetic acid and trichloroacetic acid have been determined to be satisfactory for this purpose. Sulfuric acid, nitric acid and phosphoric acid, while operable in this invention, have been found to produce poorer results than the halogen containing acids.

The final component of the solvent solution is a metal salt for providing a second cation for the double salt. Soluble nitrates, sulfates, halides and the like may be used. The halogen salts, of alkali metals such as the chlorides, iodides, bromides or fluoride of potassium, sodium, lithium, cesium and rubidium are preferred, however, because of their solubility and compatibility with the platinum group metals in the double salt. The final double salts of palladium for example may be potassium palladous chloride, lithium palladous chloride, sodium palladous iodide and the like. A primary consideration in determining the metal salt cation supplying agent is the final use to which the platinum group double salt will be put. For example, the double salts of alkali metals with platinum group metals have been found to be good catalysts for vinyl acetate synthesis from ethylene.

These components are dissolved in a sufficient amount of solvent to assure solution of all the catalyst. The solvent should be capable of dissolving the catalyst metal salts at elevated temperatures. Both water and acetic acid have been found to be effective.

The treating solution may comprise from 1–90 percent by volume of the oxidant, from 5–49 percent by volume of the anion supplying agent and from 5–49 percent of the cation supplying agent with the balance a solvent such as water or acetic acid. The proportions of ingredients do not appear to be critical beyond these limits. The primary requirements are that there be a sufficient amount of anions, cations and catalyst metal ions to form the double salt. To provide this amount, the acid or anion supplying agent must be of sufficient molar concentration to provide greater than the theoretical number of anions necessary to combine with the catalyst metal. For example, with palladium the ratio of moles of monovalent anion to moles of palladium should be at least 2:1 or greater. In order to provide the proper number of anions, the acid strength may be increased up to about 12 molar and smaller volumes used.

The preferred molar ratios of the acid, the oxidant and the cation providing agent are approximately two parts acid to one part oxidant to four parts of cation supplying agent. Preferably, the cation supplying salt should be from 1.5 to 2.5 times the anion supplying acid to provide a rapid acting and effective solubilizing agent for the contaminated palladium metal. Again it should be noted that the proportions of ingredients for the solvent solution have not been found to be critical for operability, the essential requirements for complete recovery of the contaminated catalysts being that there be a sufficient number of moles of each of the ingredients to form double salt from all of the contaminated catalyst metal.

Typical solutions which function as solvents for the catalyst metal in the process of this invention comprise:

| Solvent composition: | Volume percent |
|---|---|
| Hydrochloric acid | 1–90 |
| Sodium persulfate | 5–49 |
| Lithium chloride | 5–49 |
| Water | Balance |
| Perchloric acid | 1–90 |
| Sodium peroxide | 5–49 |
| Potassium chloride | 5–49 |
| Water | Balance |
| Fluoroboric acid | 1–90 |
| Benzoxyl peroxide | 5–49 |
| Potassium chloride | 5–49 |
| Water | Balance |
| Nitric acid | 1–90 |
| Lithium persulfate | 5–49 |
| Lithium chloride | 5–49 |
| Water | Balance |

The final double salts of platinum, for example, which are recovered by the process of this invention after treatment with the foregoing solutions are: lithium platinum chloride, potassium platinum perchlorate, potassium platinum fluoroborate, and lithium platinum nitrate, respectively.

The essential characteristic of the double salt to enable its recovery is that it must be soluble in the solution at high temperatures on the order of 80° C. or greater and insoluble at lower temperatures on the order of 10° to 20° C. This characteristic permits the double salt to be retained in the filtered solution at elevated temperatures when undissolved solids are removed but permits separation of the salt from the solution by precipitation at lower temperatures.

The mechanism of the recovery process of my invention is that the contaminated platinum metal catalyst ionizes in the oxidant, anion, and cation solution providing a pair of cations and an anion for combination. A double salt of the platinum metal is thus formed. The basic equations can be illustrated in terms of palladium recovery with a solution of hydrogen peroxide, hydrochloric acid and potassium chloride as follows:

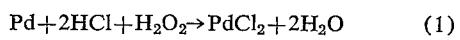
$$Pd + 2HCl + H_2O_2 \rightarrow PdCl_2 + 2H_2O \quad (1)$$

(Contaminated)

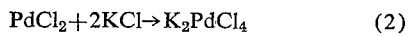
$$PdCl_2 + 2KCl \rightarrow K_2PdCl_4 \quad (2)$$

Since this salt is insoluble in the solution at room temperature or below, it begins to precipitate out of solution and may be removed by filtration, centrifuging or other conventional means of liquid-solid separation when the solution is cooled to from 10° to 20° C.

The platinum metal catalyst being treated is normally contaminated with catalyst support materials such as silica, alumina, or carbon particles. These particles are insoluble in the solvent solution even at temperatures approaching 100° C. and may be removed by filtration at these temperatures prior to cooling.

Preferably, the process is carried out at atmospheric pressures and the catalyst metal is dissolved at a temperature of from 25° to 100° C. with 80° to 90° C. being the most efficient temperature range for dissolving the platinum metal catalyst in the solution. The double salt crystals are precipitated by cooling to 10°–20° C.

The precipitated crystals of double salt are washed free of solvent by a rinse solution in which the double salt is not soluble. A rinse solution of acetone and water containing from 20 to 80 percent acetone has been found to be excellent. If greater percentages of acetone are contained in the rinse solution, precipitation of the dissolved impurities from the solvent occurs due to the acetone present. With greater percentages of water than 80 percent, the double salt product dissolves along with the impurities making it impossible to recover the product in a pure state. The preferred ratio for an acetone-water wash is about 80 percent acetone to 20 percent water. Additionally, any water soluble or miscible organic compound such as methanol, ethanol, dioxane, tetrahydrofuran, t-butyl alcohol, dimethylformamide, dimethylsulfoxide and acetic acid may be used in the place of acetone in the wash solution.

After the double salt crystals have been filtered out, the filtered solution may be evaporated to about ¼ to 1/10 of its volume and a second crystal harvest can be made. The filtered solution which is now substantially free of the platinum metal can be discarded. The crystals are then dried at a temperature of from about 100° to 350° C. At lower drying temperatures, water is not completely removed from the crystals and at higher drying temperatures decomposition of the salt occurs.

The process of this invention recovers essentially 100 percent of the initial contaminated platinum metal. Small percentages may be lost however in the initial filtration or in the final recovery of the salt. For all practical purposes, however, the recovery is essentially 100 percent and in all cases greater than 99.5 percent of the initial platinum metal catalyst is recovered.

Initially, the contaminated catalyst can be heated to from 80° to 90° C. in the acid to partially dissolve it. Stirring or swirling agitation of the acid during this step is preferred. The cation providing agent may then be added to the heated solution of acid and platinum metal which should now be at a temperature of about 90° C. The addition of water dissolves the cation providing agent and a major portion of the platinum metal. At this point, the peroxidant and salt may be added to ionize and complete dissolving of the platinum metal catalyst. The solution may then be brought to its boiling point (about 100° C.) and filtered to remove undissolved solids such as catalyst support impurities and metallic impurities. When the solution is cooled to from about 10° to 20° C., the double salt crystals rapidly form a semisolid liquid slush of crystals which are recoverable by filtration.

If copper chloride is the contaminant and palladium is the platinum metal catalyst, the copper salts remain in solution at temperatures on the order of 10° to 20° C. and are removed by filtration. Those portions of the solution retained on the filtrate crystals are easily washed off in the rinse solution. Double salt palladium crystals recovered in this manner are free of copper or other contaminants and recovery is practically 100 percent.

As illustrated in the example which follows, which is intended merely to exemplify a single embodiment of the invention, the double salt recovered according to the process of this invention may be described as an alkali metal chloro-platinum group metalate such as, for example, potassium chloro-platinate or potassium chloro-palladate, the latter being illustrated in the following example:

Example

One hundred twenty-four grams of copper-contaminated palladium metal (1.16 mole) was placed in a 2-liter Erlenmeyer flask along with 430 ml. of 6 N HCl (1.27 mole). The flask was cooled to prevent boiling and 131 ml. (1.16 mole) of 30 percent $H_2O_2$ was added in 5-ml. portions during about 30 minutes while swirling the flask contents. 179 grams of potassium chloride (2.40 mole) were then added and the mixture heated to about 90° C. About 400 ml. of water was then added until most of the KCl dissolved. The temperature of the mixture was 80°–90° C. while 44 ml. of 30 percent $H_2O_2$ (0.33 mole) was added in 2-ml. portions over a period of about 4 hours. At this point the palladium metal and KCl were completely dissolved. The solution was brought to its boiling point and filtered with the aid of 1 teaspoon of filter aid (Celite). Upon cooling the filtrate slightly, clusters of well formed rectangular bars of $K_2PdCl_4$ rapidly formed. The individual crystals appeared greenish colored when viewed through the solution. After cooling to about 10° C., the crystalline slush was filtered and crystals washed with acetone-water (80–20 by volume) until the filtrate was essentially colorless. Copper salts stayed in solution in the acetone-water and colored it orange. The brown crystals of $K_2PdCl_4$ were dried at about 200° C. for 1 hour. Upon melting a weighed portion, 1 wt. percent was liberated. No copper was present in the recovered crystals.

Evaporation of the mother liquors yielded a second crop of $K_2PdCl_4$ crystals equally as pure as the first. At this point, the mother liquors appeared essentially free of palladium and upon complete evaporation there was about 100 g. of bright green crystals of $CuCl_2$ and KCl left with only a very few rectangular needle crystals of the brown $K_2PdCl_4$.

In the place of water as a base solvent for the solution, it has been found that acetic acid may be used. The acetic acid acts as a solvent without interferring with or entering into the salt forming reaction or the oxidation of the platinum metal catalyst to be recovered.

Many modifications and variations of the invention, as hereinbefore set forth, may be made without departing from the spirit and scope thereof and therefore only such limitations should be imposed as are indicated in the appended claims.

I claim:
1. A process for recovering substantially pure platinum group metal salts from copper contaminated platinum group metal catalysts comprising the steps of:
    dissolving said contaminated platinum group metal catalysts at temperatures of from about 25° C. to about 100° C. in a solution comprising a solvent for salts of the platinum group metal, a peroxidic oxidant, chloride ion, and an alkali metal cation;
    removing undissolved solids from said solution;
    cooling said solution to below about 25° C. to form crystals of an alkali metal chloro-platinum group metalate double salt;
    separating said crystals from said mixture by liquid-solid separation; and
    recovering said crystals.
2. The process as defined in claim 1 further comprising the step of evaporating at least a portion of said solution after said crystals have been separated to recover additional salt crystals therefrom.
3. The process defined in claim 1 wherein said metal catalyst is platinum.
4. The process defined in claim 1 wherein said metal catalyst is palladium.
5. The process defined in claim 1 wherein the solution is cooled to below 20° C. to recover said double salt crystals.
6. The process of claim 5 wherein said solution comprises water, hydrochloric acid, potassium chloride and hydrogen peroxide.
7. The process of claim 1 wherein said solvent is acetic acid.
8. The process of claim 1 wherein said solvent is water.
9. The process of claim 1 wherein said crystals are separated by filtration, recovered by rinsing in acetone-water bath in which said crystals are insoluble and dried at a temperature of from 100° to 350° C.
10. The process for recovering substantially pure alkali metal chloro-palladate double salts from copper contaminated palladium catalysts comprising:
    dissolving said palladium catalysts along with copper contaminants at a temperature of from 25° C. to 100° C. in a solution comprising a solvent selected from the group consisting of acetic acid and water, a peroxidic oxidant, hydrochloric acid and alkali metal ions;
    cooling said solution to a temperature below about 20° C. at which said alkali metal palladium double metal salts are insoluble therein but said contaminants are soluble therein to cause precipitation of said double salts from said solution; and
    separating said alkali metal chloro-palladate double metal salts from said solution.
11. The process of claim 10 wherein said alkali metal ions are potassium ions and wherein said double salt is $K_2PdCl_4$.

References Cited

UNITED STATES PATENTS

| | | | |
|---|---|---|---|
| 2,150,366 | 3/1939 | Ehrhart | 23—87 |
| 3,088,802 | 5/1963 | Clements et al. | 23—51 |
| 3,210,152 | 10/1965 | Van Helden et al. | 23—87 |
| 3,294,483 | 12/1966 | Hirschberg | 23—87 |
| 3,294,484 | 12/1966 | Ellis | 23—87 |

OTHER REFERENCES

J. W. Mellon's "A Comprehensive Treatise on Inorganic and Theoretical Chemistry," vol. 15, 1936 ed., pp. 660, 668, 669, 671–673. Longmans, Green & Co., N.Y., publishers.

EDWARD STERN, Primary Examiner

U.S. Cl. X.R.

23—50, 59, 85, 88, 102; 252—182